(12) United States Patent
Baker, Jr.

(10) Patent No.: US 10,081,780 B1
(45) Date of Patent: Sep. 25, 2018

(54) SYSTEM FOR PRODUCING ESSENTIAL OILS

(71) Applicant: Kenneth Colin Baker, Jr., Hemet, CA (US)

(72) Inventor: Kenneth Colin Baker, Jr., Hemet, CA (US)

( * ) Notice: Subject to any disclaimer, the term of this patent is extended or adjusted under 35 U.S.C. 154(b) by 124 days.

(21) Appl. No.: 14/952,253

(22) Filed: Nov. 25, 2015

Related U.S. Application Data

(60) Provisional application No. 62/085,128, filed on Nov. 26, 2014.

(51) Int. Cl.
*C11B 9/02* (2006.01)
*B01D 11/02* (2006.01)

(52) U.S. Cl.
CPC .......... *C11B 9/025* (2013.01); *B01D 11/0203* (2013.01); *B01D 11/0207* (2013.01)

(58) Field of Classification Search
CPC ............................. C11B 9/025; B01D 11/0203
See application file for complete search history.

(56) References Cited

U.S. PATENT DOCUMENTS

| | | | | |
|---|---|---|---|---|
| 4,282,259 A * | 8/1981 | Wheldon | ........... | B01D 11/0203 159/24.2 |
| 5,173,188 A * | 12/1992 | Winter | ............... | B01D 11/0203 210/634 |
| 5,516,923 A * | 5/1996 | Hebert | ...................... | C11B 1/10 554/11 |
| 9,766,214 B2 * | 9/2017 | Goto | ...................... | G01N 30/36 |
| 2002/0144717 A1 * | 10/2002 | Tunnicliffe | ........ | B01D 11/0203 134/26 |
| 2009/0113903 A1 * | 5/2009 | Babkin | .................. | C09K 5/041 62/114 |
| 2011/0133120 A1 * | 6/2011 | McGhee | ............ | B01D 11/0219 252/182.12 |

OTHER PUBLICATIONS

Kumoro et al. Supercritical Carbon Dioxide Extraction of Andrographolide from Andrographis paniculata: Effect of the Solvent Flow Rate, Pressure, and Temperature. Chin. J. Chem. Eng., 15(6) 877-833 (2007).*

* cited by examiner

*Primary Examiner* — Donald R Spamer
(74) *Attorney, Agent, or Firm* — Plager Schack LLP

(57) ABSTRACT

A system can be used for extracting essential oils from plant matter. The system includes an extraction vessel that is configured to hold the plant matter from which the essential oil is extracted. A separation vessel is connected to the extraction vessel and configured to separate the essential oil from the plant matter. A compressor is connected to the extraction vessel and the separation vessel with a fluid system and configured to use super critical carbon dioxide to push the essential oil from the extraction vessel to the separation vessel separating the essential oil from the plant matter. A heat exchanger is attached to the fluid system and configured to cool the carbon dioxide released from the compressor. A control system is connected to the compressor.

6 Claims, 4 Drawing Sheets

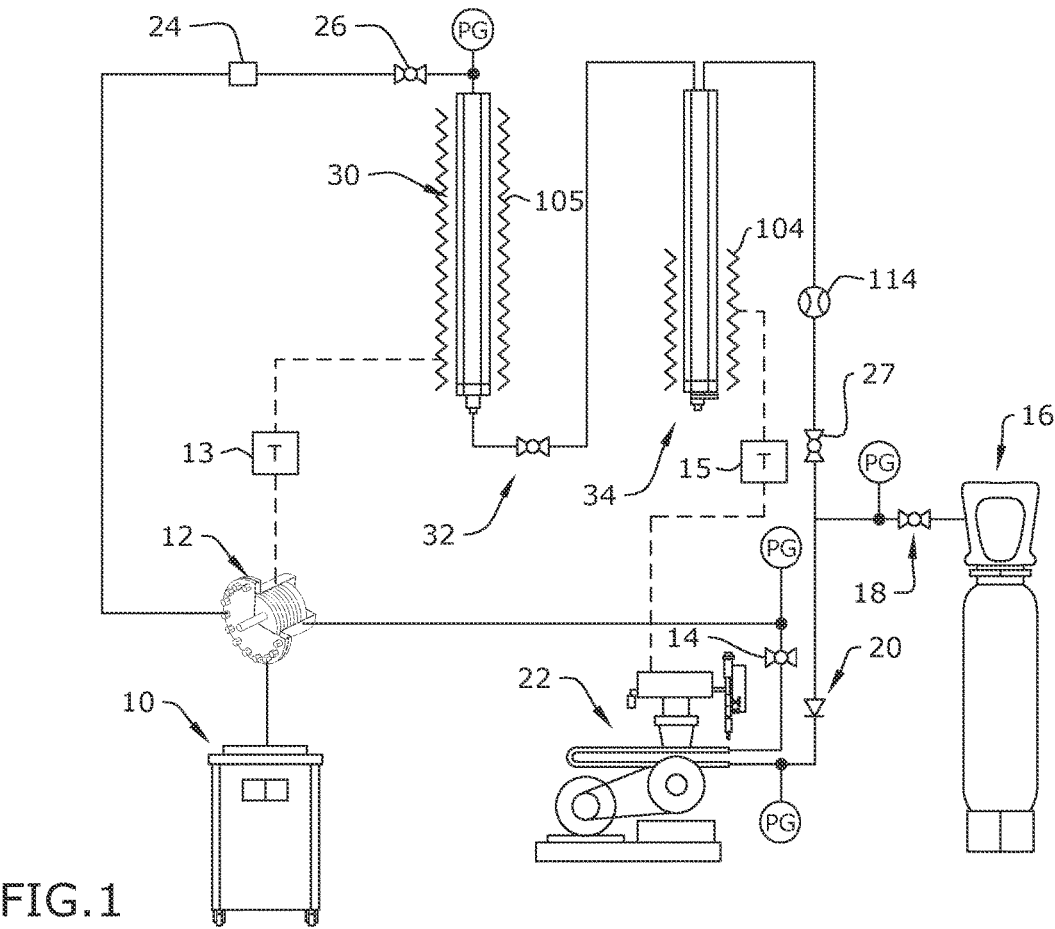
FIG.1
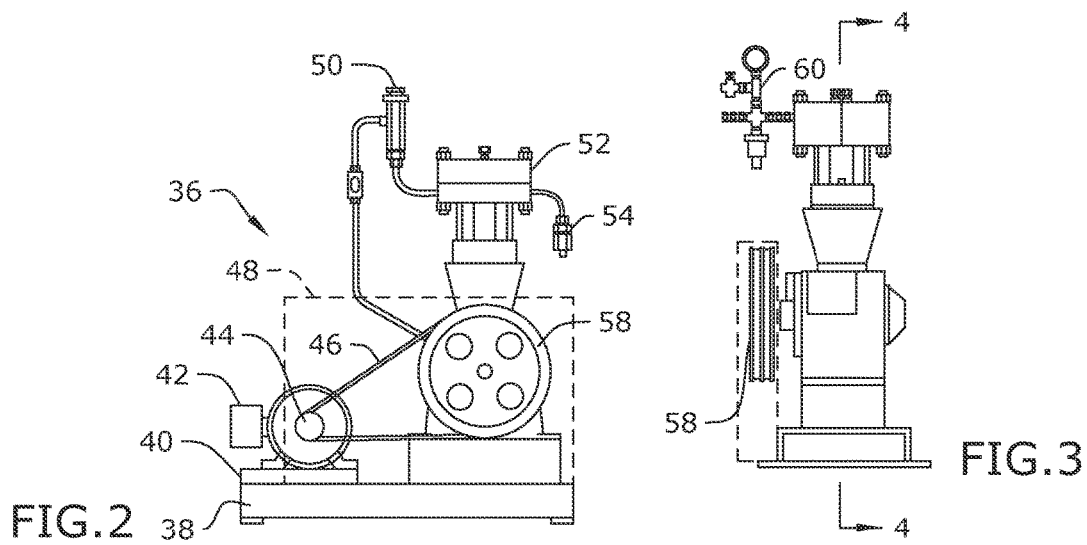
FIG.2
FIG.3

SYSTEM FOR PRODUCING ESSENTIAL OILS

RELATED APPLICATION

This application claims priority to provisional patent application U.S. Ser. No. 62/085,128 filed on Nov. 26, 2014 the entire contents of which is herein incorporated by reference.

BACKGROUND

The embodiments described herein relate to a variety of applications including the extraction of applications in botanical extract of food science, functional food ingredients, pharmaceuticals, cosmetics, polymers, powders, bio- and functional materials, natural products, biotechnology, fossil and biofuels. More particularly, to a system for producing essential oils from dry material at supercritical pressure, temperature, and flow rate having a higher extraction in less time than other methods using carbon dioxide supercritical fluid technology.

Prior to embodiments of the disclosed invention, using solvents to extract essential oils operate at a relatively slow speed. Embodiments of the disclosed invention solve this problem.

SUMMARY

A system can be used for extracting essential oils from plant matter. The system includes an extraction vessel that is configured to hold the plant matter from which the essential oil is extracted. A separation vessel is connected to the extraction vessel and configured to separate the essential oil from carbon dioxide. A compressor is connected to the extraction vessel and the separation vessel with a fluid system and configured to use super critical carbon dioxide to push the extracted essential oil from the extraction vessel to the separation vessel separating the essential oil from the plant matter. A heat exchanger is attached to the fluid system and configured to cool the carbon dioxide released from the compressor. A control system is connected to the compressor and programmed with instructions for doing the following. First, monitoring a flow rate of carbon dioxide through the fluid system over time while operating a timer by iteratively performing the following steps until the timer reaches a predetermined value. First, determining the flow rate of carbon dioxide through the fluid system. Then, adjust the fluid system to ensure the flow rate is constant over time. Finally, stopping the flow rate of carbon dioxide through the compressor.

In some embodiments, the extraction vessel further comprises a heating element, surrounding the extraction vessel heating both the carbon dioxide and the plant matter. The separation vessel can further comprise a heating element, surrounding the separation vessel heating both the carbon dioxide and the essential oil. A needling valve can be attached to the fluid system between the extraction vessel and the separation vessel and configured to cool the carbon dioxide by a drop in pressure before entering the separation vessel.

In some embodiments, monitoring the flow rate of carbon dioxide through the fluid system further can include measuring the flow rate, pressure and temperature of the carbon dioxide. In some embodiments, monitoring the flow rate of carbon dioxide through the fluid system further can include calculating a target flow rate, a target pressure and a target temperature of the carbon dioxide. In some embodiments, adjusting the fluid system can further include increasing an output pressure of the compressor.

BRIEF DESCRIPTION OF THE FIGURES

The detailed description of some embodiments of the invention is made below with reference to the accompanying figures, wherein like numerals represent corresponding parts of the figures.

FIG. 1 is a schematic view of an embodiment of the invention demonstrating dry plant extraction using supercritical fluid.

FIG. 2 is a side schematic view of an embodiment of the diaphragm compressor.

FIG. 3 is a front schematic view of an embodiment of the diaphragm compressor.

DETAILED DESCRIPTION OF CERTAIN EMBODIMENTS

Figure 4:
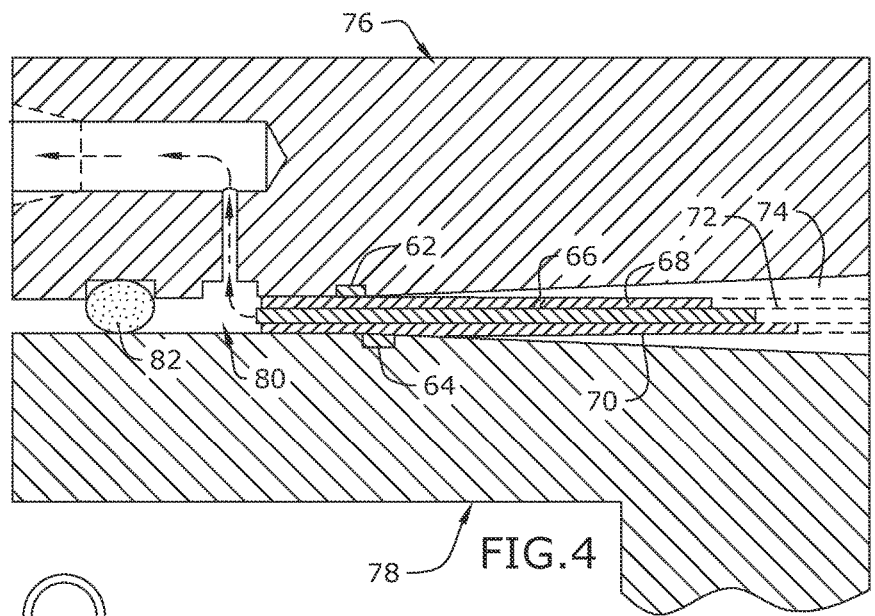
FIG. 4 is a section view of an embodiment of the invention along line 4-4 in FIG. 3.
Figure 5:
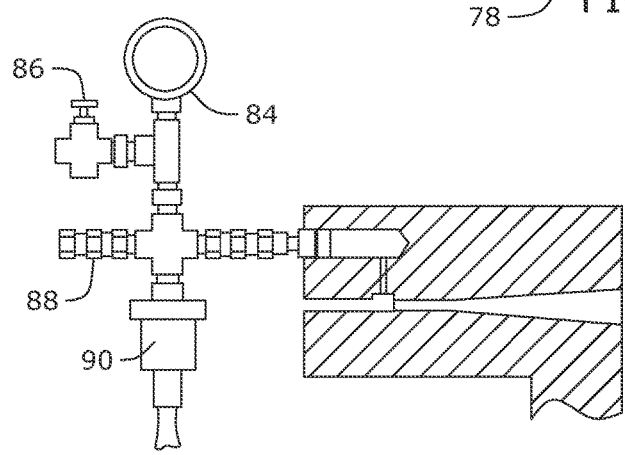
FIG. 5 is a section detail view of an embodiment of the invention.
Figure 6:
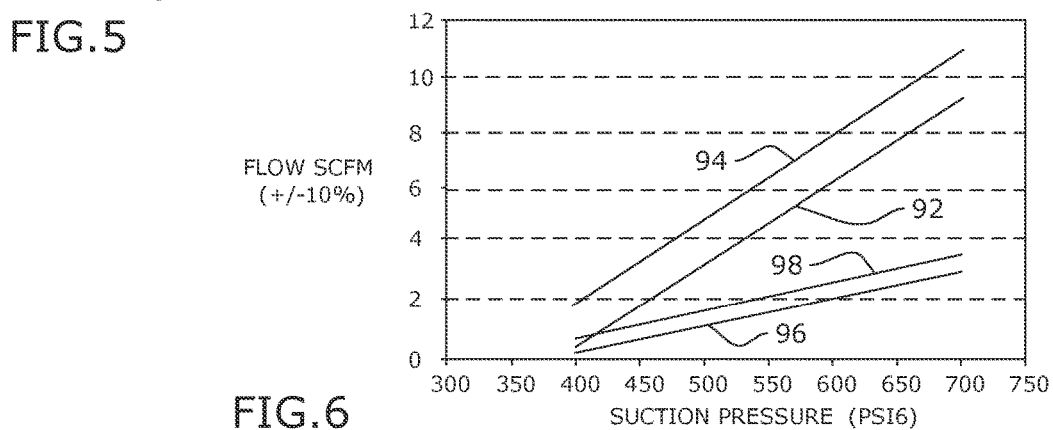
FIG. 6 is a schematic view of an embodiment of the invention demonstrating theoretical flow chart using a diaphragm compressor.
Figure 7:
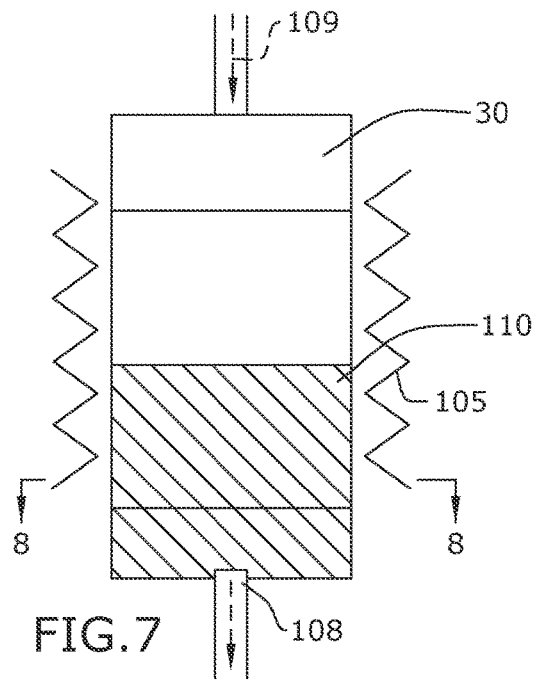
FIG. 7 is a section detail of an embodiment of the extraction vessel.
Figure 8:
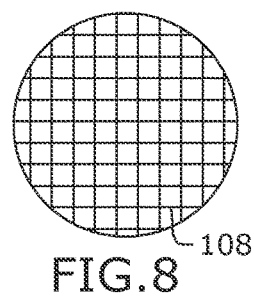
FIG. 8 is a section detail view of an embodiment of the wire mesh.
Figure 9:
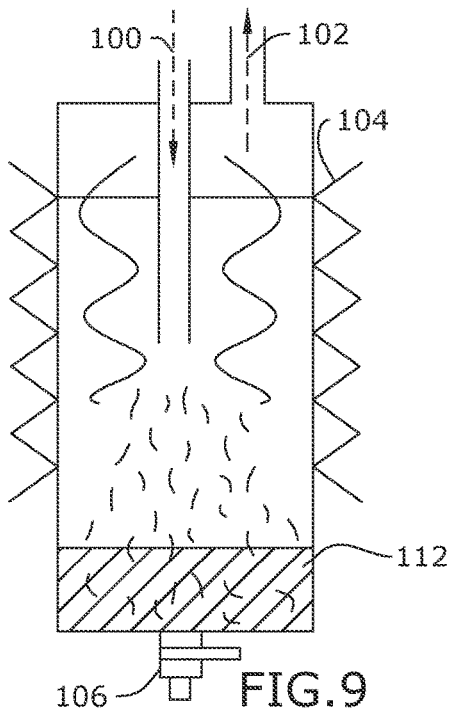
FIG. 9 is a section detail view of an embodiment of the separation vessel.

By way of example, and referring to FIG. 1, one embodiment of the present system comprises chiller 10. Chiller 10 is connected to heat exchanger 12. Heat exchanger 12 is connected in a closed loop to extraction vessel 30. In some embodiments extraction vessel 30 is a heated extraction vessel. Between heat exchanger 12 and extraction vessel 30 is ruptured disc 24 and first ball valve 26. First temperature measuring instrument 13 measures the differential temperature between heat exchanger 12 and extraction vessel 30. Before entering the extraction vessel 30 there is a pressure gauge which measures an extraction vessel input pressure. Extraction vessel 30 is connected to separation vessel 34 with needle valve 32. Separation vessel 34 is connected to compressor 22 with second ball valve 27 and check valve 20. Carbon dioxide charging tank 16 is connected to the closed loop between second ball valve 27 and check valve 20 with third ball valve 18. Compressor 22 is connected to heat exchanger 12 with second needle valve 14. Second temperature measuring instrument 15 measures the differential temperature between separation vessel 34 and compressor 22.

Compressor 22 converts low pressure carbon dioxide gas at suction side which is monitored with a compressor input pressure gauge to high pressure supercritical fluid 109 at a discharge port which is monitored with a pressure gauge and thermostat. Discharge pressure is controlled by resistance of a second needle valve 14 representing the piping and vessel network, creating a consistent pressure and flow rate after discharge port of compressor 22. Because of the high temperature leaving the high side of the carbon dioxide compressor, a chiller 10 with a temperature adjustment and a heat exchanger 12 are preset to bring temperature of carbon dioxide stream down while maintaining the pressure to the extent possible. Lowering temperatures above supercritical temperatures increases density of supercritical fluid 109 is monitored with a thermostat. The carbon dioxide stream exiting heat exchanger 12 is supercritical fluid 109 with all critical properties including molecular weight, critical temperature, critical pressure, critical density, and flow rate.

Ruptured disc 24 is placed in the carbon dioxide stream between heat exchanger 12 and extraction vessel 30 before first ball valve 26 to control pressure in the system. At this point, the supercritical fluid 109 may flow through extraction vessel 30 with a heating element coupled to a temperature adjustment maintaining temperature of extraction vessel 30 that contains material to be extractable. Temperature preset to a consistent system operation above critical temperature to maintain a consistent temperature while maintaining a consistent flow rate. Extraction vessel 30 fits inside of a heating element forming an extraction chamber 105. Prior to use extraction vessel 30 is filled with plant matter 110 from which the user desires to extract essential oil 112. Temperature and pressures at extraction vessel 30 are monitored with thermostat and pressure gauge. Food grade wire mesh 108 is used at end cap of exit cap. This mesh sieve size governs size and grade of oils.

The carbon dioxide stream then flows through needle valve 32 which is used to create a pressure differential systematically dropping temperature forming solid carbon dioxide 100. The solid carbon dioxide stream 100 then proceeds to separation vessel 34 with a heating element 104 forming a separation chamber that increases temperature that is adequate to allow carbon dioxide vapor 102 to rise and maintain a system consistent flow rate of carbon dioxide. Solid carbon dioxide 100 bonded with essential oil fall to the bottom of separation vessel 34, and the carbon dioxide vapor 102 rises up through top of separation vessel 34 due to a heating element coupled to a temperature adjustment. The essential oil 112 is then drained through drain valve 106.

Separation vessel 34 fits inside a heating element 104 that is monitored with thermostat and pressure gauge. Then through flow measuring instrument 114 that monitors flow rate using calculated ratio of flow and pressure at controlled system temperature for a consistent state of operation and back to the low pressure side of compressor 22. Third ball valve 18 and pressure gauge near the discharge of carbon dioxide charging tank 16 and before the tee joint near low side of compressor 22 is used to increase the pressure as a secondary carbon dioxide stream, and to initially pressurize the system going into the suction side of compressor 22. The components high pressure vessels and valves (such as high pressure stainless steel) of the system may be operatively attached to one another using high pressure piping or tubing. Components of system should have burst pressure rated 30% higher than maximum pressure used in system. Ruptured disc 24 and relief valves should be set 30% lower than burst pressure of components of system. It is important to have a stabilization period for at least 30 minutes for providing adequate contact between the dry material and the solvent prior to reciprocating significantly increases extraction yield.

In some embodiments compressor 22 can be a diaphragm compressor 36 as shown in FIGS. 2-5. Diaphragm compressor 36 further comprises base weld mount 38 attached to slide base 40 and head assembly 52. Slide base 40 is connected to motor 42. Motor 42 is connected to sheave and bushing 44. Drive belt 46 connects sheave and bushing 44 to flywheel 58. Flywheel 58 is connected to head assembly 52. Drive belt 46 and flywheel 58 is surrounded by belt guard 48 to prevent injury. Head assembly 52 is connected to relief valve 50, oil suction check valve 54 and leak detection system 60.

Diaphragm compressor 36 further comprises process head 76 joined to oil head 78 with cavity 74 therebetween. Process head 76 is adjacent to process side diaphragm 68 which is partially separated by opening 66 at a first end and process seal O-ring 62 at a second end. Oil head 78 is adjacent to oil side diaphragm 70 which is partially separated by an opening at a first end and an oil seal O-ring 64 at a second end. Between process side diaphragm 68 and oil side diaphragm 70 is leak detection diaphragm 72. In some embodiments, leak detection diaphragm 72 has radial scribes on both sides. In operation the movement of process side diaphragm 68 and oil side diaphragm 70 causes air to be compressed and pushed along leak path 80 away from leak retainer O-ring 82 and into leak detection system 60. Leak detection system 60 further comprises gauge 84, vent valve 86, relief valve 88 and pressure switch 90. As noted above diaphragm compressor 36 operates to provide compressed carbon dioxide stream into the system.

A variety of compressors can be used as compressor 22. The important feature is that the compressors are able to create a constant flow rate which is shown on the y-axis in standard cubic feet per minute. This can be done with a constant suction pressure, shown on the x-axis in pounds per square inch gauge (PSIG). Line segment 92 shows an A2-550 compressor operating with a discharge pressure of 7975 PSIG. Line segment 94 shows an A2-550 compressor operating with a discharge pressure of 5075 PSIG. Line segment 96 shows an A1-550 compressor operating with a discharge pressure of 7975 PSIG. Line segment 98 shows an A1-550 compressor operating with a discharge pressure of 5075 PSIG.

Figure 10:
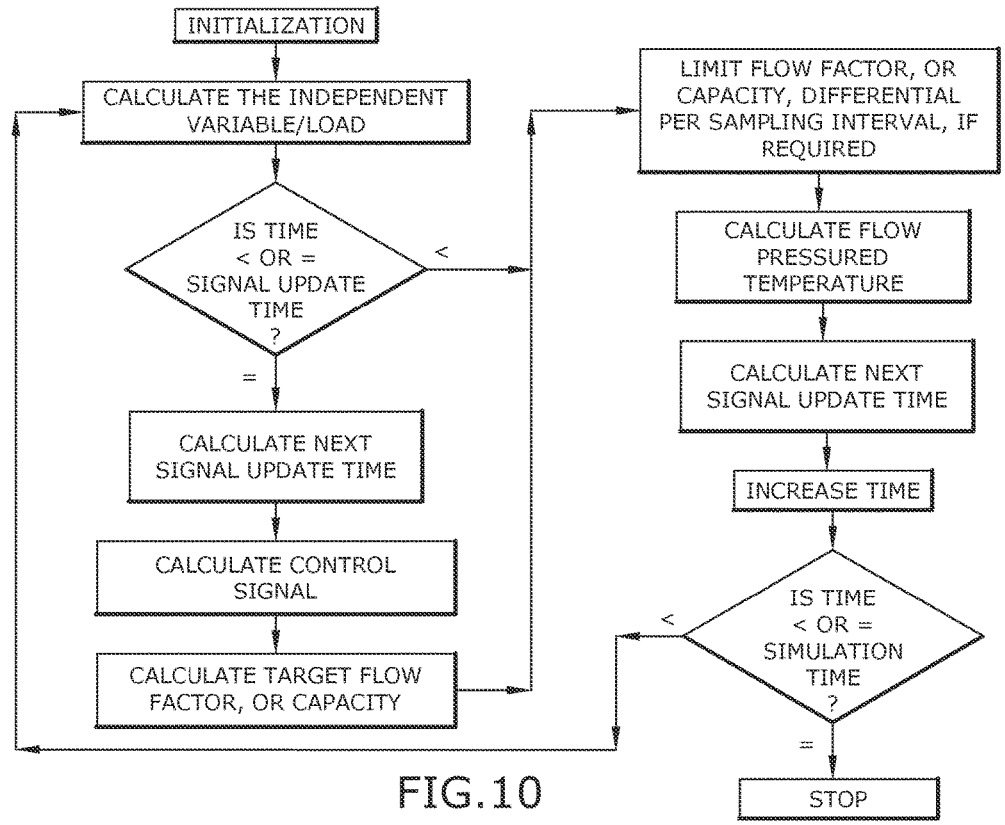
FIG. 10 is a schematic view of an embodiment of the system mode.

Turning to FIG. 10, a setup control logic can operate as follows. After initialization the system calculates the flow rate based on the desired suction pressure. A timer begins and is programmed with a signal time. While the process is running if the signal time is not yet reached then the suction pressure, capacity differential per sample interval or another variable is calculated. After that a subsequent signal time is calculated, the timer is increased and the simulation time is again checked, if the simulation time is reached then the process stops. For a condition when the signal time is reached but the simulation time is not reached then the next signal time is calculated, the control signal is calculated. After that the target flow rate, factor or capacity is calculated.

Figure 11:
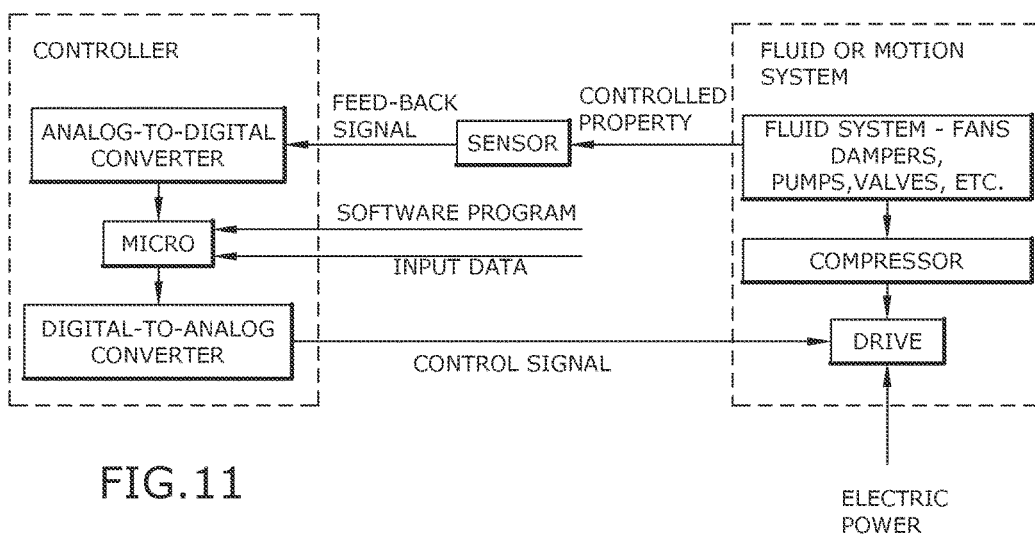
FIG. 11 is a schematic diagram of the control system.

As shown in FIG. 11, a controller comprises an analog to digital converter communicatively coupled to a microcontroller. The microcontroller is connected to a digital to analog converter. The microcontroller receives programming instructions from computer software and receives input data from user inputs such as property tables for carbon dioxide. The fluid or motion system comprises fluid components such as compressor 22, separation vessel 34, extraction vessel 30, along with various valves discussed above. These fluid systems are connected to actuators or motors that drive the respective systems with electrical power upon receiving a control signal from a digital to analog converter. The fluid systems are further communicatively coupled to sensors that measure control properties (flow rate, pressure, temperature, etc.) these signals are sent to the analog to digital converter in the controller.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for extracting essential oils from plant matter, the system comprising:
   a fluid system further comprising:
   an extraction vessel, configured to hold the plant matter from which the essential oil is extracted;
   a separation vessel, connected to the extraction vessel downstream in the fluid system from to the extraction vessel and configured to separate the essential oil from carbon dioxide;
   a compressor, connected to the extraction vessel, wherein the compressor is upstream of the extraction vessel and downstream of the separation vessel; wherein the compressor is configured to use super critical carbon dioxide to push the plant matter from the extraction vessel to the separation vessel separating the essential oil from the carbon dioxide;
   a needling valve, attached to the fluid system between the extraction vessel and the separation vessel and configured to cool the carbon dioxide by a drop in pressure before entering the separation vessel;
   a heat exchanger combined with a chiller, wherein the heat exchanger is upstream of the extraction vessel and downstream of the compressor; wherein the heat exchanger is configured to cool the carbon dioxide released from the compressor;
   a control system; connected to the compressor and programmed with instructions for:
   monitoring a flow rate of carbon dioxide through the fluid system by adjusting the needling valve over time while operating a timer by iteratively performing the following steps until the timer reaches a predetermined value:
   determining the flow rate of carbon dioxide through the fluid system; and
   adjusting the fluid system to ensure the flow rate is constant over time;
   wherein adjusting the needling valve further involves creating a pressure differential by systematically dropping a temperature of the carbon dioxide forming solid carbon dioxide; creating a low pressure at the suction port of the compressor.

2. The system of claim 1, wherein the extraction vessel further comprises a heating element, surrounding the extraction vessel heating both the carbon dioxide and the plant matter.

3. The system of claim 2, wherein the separation vessel further comprises a heating element, surrounding the separation vessel heating both the carbon dioxide and the plant matter.

4. The system of claim 1 wherein monitoring the flow rate of carbon dioxide through the fluid system further comprises: measuring the flow rate, pressure and temperature of the carbon dioxide.

5. The system of claim 4 wherein monitoring the flow rate of carbon dioxide through the fluid system further comprises: calculating a target flow rate, a target pressure and a target temperature of the carbon dioxide.

6. The system of claim 5, wherein adjusting the fluid system further comprises: increasing an output pressure of the compressor.

* * * * *